United States Patent
Nakayama

(10) Patent No.: US 11,085,752 B2
(45) Date of Patent: Aug. 10, 2021

(54) SURFACE PROPERTY MEASURING DEVICE AND CONTROL METHOD FOR SAME

(71) Applicant: MITUTOYO CORPORATION, Kanagawa (JP)

(72) Inventor: Tatsuki Nakayama, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 124 days.

(21) Appl. No.: 16/593,277

(22) Filed: Oct. 4, 2019

(65) Prior Publication Data
US 2020/0132428 A1   Apr. 30, 2020

(30) Foreign Application Priority Data

Oct. 24, 2018   (JP) .............................. JP2018-199956

(51) Int. Cl.
| G01B 5/28 | (2006.01) |
| G01B 5/00 | (2006.01) |
| G01B 3/00 | (2006.01) |

(52) U.S. Cl.
CPC ............... G01B 5/28 (2013.01); G01B 3/008 (2013.01); G01B 5/0004 (2013.01)

(58) Field of Classification Search
CPC ........ G01B 5/28; G01B 5/0004; G01B 3/008; G01B 5/20; G05D 15/01
USPC .......................................................... 33/503
See application file for complete search history.

(56) References Cited

U.S. PATENT DOCUMENTS

| 8,701,301 B2 * | 4/2014 | Nakayama | ........... G01B 5/0016 33/554 |
| 8,898,923 B2 * | 12/2014 | Nahum | ................... G01L 5/009 33/810 |
| 8,915,124 B2 * | 12/2014 | Nakayama | ............. G01B 21/30 73/105 |

(Continued)

FOREIGN PATENT DOCUMENTS

| JP | 2012-225742 A | 11/2012 |
| JP | 2014-219216 A | 11/2014 |
| JP | 6133678 B2 | 5/2017 |

OTHER PUBLICATIONS

U.S. Appl. No. 16/655,811 to Tatsuki Nakayama, filed Oct. 17, 2019.

*Primary Examiner* — Yaritza Guadalupe-McCall
(74) *Attorney, Agent, or Firm* — Greenblum & Bernstein, P.L.C.

(57) ABSTRACT

A surface property measuring device includes a measuring arm that is supported so as to be capable of circular arced movement, a stylus that is provided to a distal end of the measuring arm, a position change detector that detects a change in position of the measuring arm, and a measurement force applier (voice coil motor) that biases the measuring arm in a circular arced movement direction and applies a measurement force. A control device includes a central controller that outputs a measurement force instruction that issues an instruction for an orientation and size of the measurement force, and a measurement force controller that controls the orientation and size of the measurement force produced by the measurement force applier. The measurement force controller monitors a position change detection, and when a position change speed of the measuring arm exceeds a predetermined threshold value, applies feedback.

15 Claims, 9 Drawing Sheets

(56) References Cited

U.S. PATENT DOCUMENTS

| | | | | |
|---|---|---|---|---|
| 9,091,521 B2* | 7/2015 | Nakayama | ............... | G01B 5/28 |
| 10,514,244 B2 | 12/2019 | Nakayama et al. | | |
| 2012/0227476 A1* | 9/2012 | Nakayama | ............. | G01B 21/20 |
| | | | | 73/105 |
| 2012/0266475 A1* | 10/2012 | Nakayama | ............. | G01B 3/008 |
| | | | | 33/558 |
| 2013/0133409 A1* | 5/2013 | Nakayama | ............. | G01B 3/008 |
| | | | | 73/104 |
| 2014/0326057 A1* | 11/2014 | Nakayama | ............. | G01B 5/201 |
| | | | | 73/105 |
| 2020/0132428 A1* | 4/2020 | Nakayama | ............. | G01B 3/008 |
| 2020/0132429 A1* | 4/2020 | Nakayama | ............... | G01B 5/28 |

\* cited by examiner

Fig. 5

| Measurement speed (mm/s) | (Drop detection speed) Threshold value (mm/s) | Maximum tracking angle (°) | Drop detection distance (mm) |
|---|---|---|---|
| 0.02 | 10 | 83 | 0.5 |
| 0.20 | 10 | 83 | 0.5 |
| 1.00 | 10 | 83 | 0.5 |
| 2.00 | 20 | 83 | 1.2 |
| 5.00 | 30 | 81 | 2.1 |
| 10.00 | 30 | 72 | 2.1 |
| 20.00 | 30 | 56 | 2.1 |
| 30.00 | 30 | 45 | 2.1 |

471

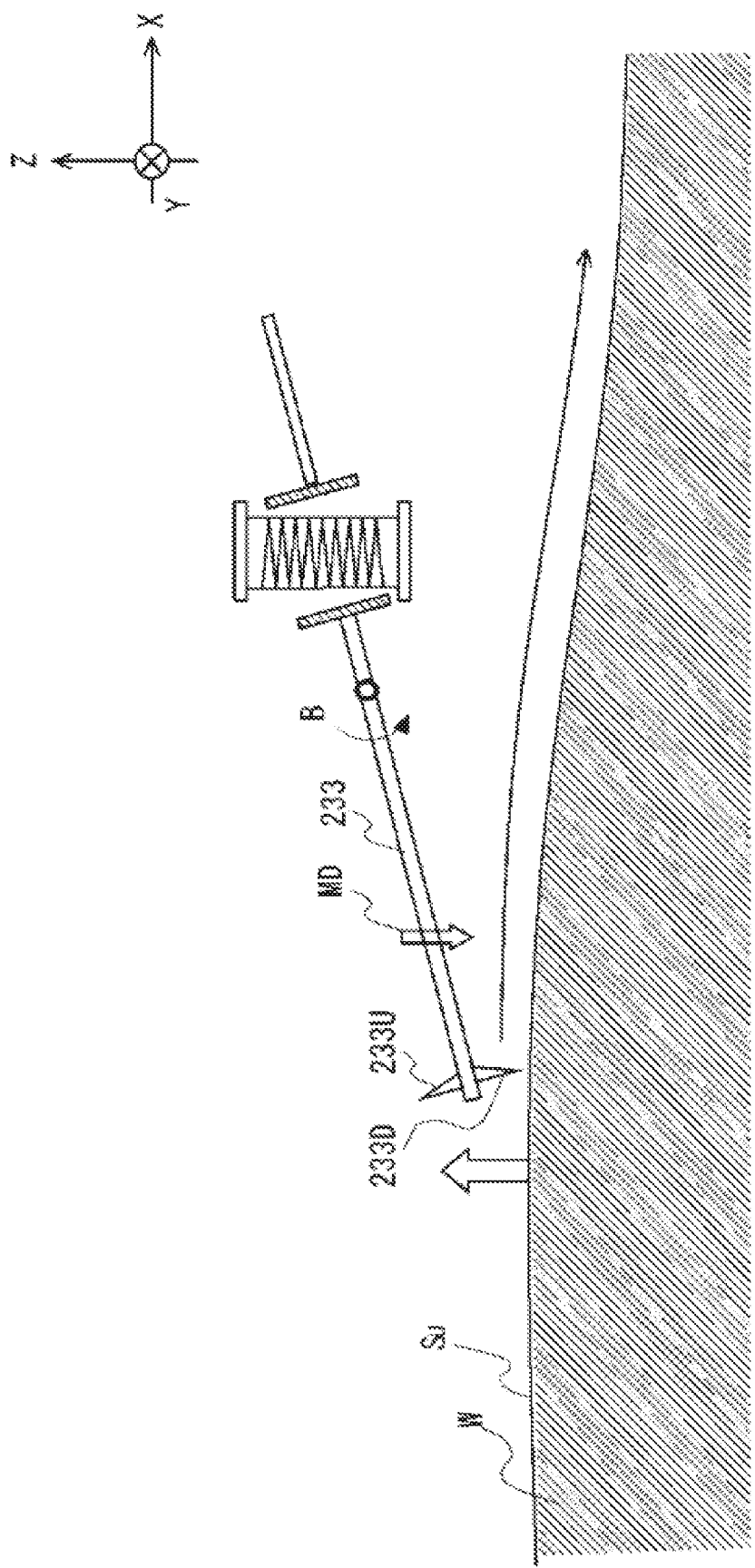

SURFACE PROPERTY MEASURING DEVICE AND CONTROL METHOD FOR SAME

CROSS-REFERENCE TO RELATED APPLICATIONS

The present application claims priority under 35 U.S.C. § 119 of Japanese Application No. 2018-199956, filed on Oct. 24, 2018, the disclosure of which is expressly incorporated by reference herein in its entirety.

BACKGROUND OF THE INVENTION

1. Field of the Invention

The present invention relates to a surface property measuring device and a control method for the device.

2. Description of Related Art

A surface property measuring device is known which measures surface properties (contour, roughness, undulations, and the like) of a measured object (measurable object or object to be measured) by performing tracing scanning of a surface of the measured object with a stylus (see Japanese Patent Laid-open Publication No. 2012-225742). The surface property measuring device disclosed in Japanese Patent Laid-open Publication No. 2012-225742 includes a measuring arm that is supported so as to be capable of circular arced movement, a stylus that is provided to a distal end of the measuring arm, a measurement force applier that exerts a force on the measuring arm such that the stylus contacts the measured object with a predetermined measurement force, a displacement mechanism that causes the measuring arm to displace relative to a stage, and a position change detector that detects a change in position due to the circular arced motion of the measuring arm.

There is an angle that is a boundary to where the surface property measuring device can track while the measuring arm performs scanning displacement (tracking limit angle). That is, when an inclination angle of a measured surface is gentle (inclination angle is equal to or less than the tracking limit angle), the stylus can perform scanning displacement while in contact with the measured surface at a constant measurement force. Meanwhile, when the measured surface has a step with a large inclination angle and the inclination angle exceeds the tracking limit angle, the stylus is unable to track along the incline of the measured surface, and floats up and away from the measured surface, after which the stylus once again closely approaches and collides with the measured surface (referred to as a drop of the measuring arm). When a drop of the measuring arm occurs, there is a possibility that the stylus and the measured object may be damaged by the collision. In response to this, the applicant of the present application has proposed a surface property measuring device that can prevent an unfavorable situation such as the stylus colliding with the measured object (see Japanese Patent No. 6133678).

The surface property measuring device disclosed in Japanese Patent No. 6133678 includes a measurement force instruction portion that outputs a measurement force instruction that issues an instruction for an orientation and size of the measurement force, and a measurement force controller that controls the orientation and size of the measurement force produced by the measurement force applier by applying a control signal to the measurement force applier. The measurement force controller has a configuration in which a position change detection signal from the position change detector is monitored and when a position change speed of the measuring arm is equal to or less than a predetermined threshold value, the control signal is applied to the measurement force applier so as to produce a measurement force with the orientation and size corresponding to the measurement force instruction, and when the position change speed of the measuring arm exceeds the predetermined threshold value, feedback is applied so as to produce in the measurement force applier a force in a direction that lifts a distal end of the measuring arm upward. Thus, according to the surface property measuring device disclosed in Japanese Patent No. 6133678, even when the position change speed of the measuring arm exceeds the predetermined threshold value (when a drop of the measuring arm occurs), feedback can be applied so as to produce in the measurement force applier a force in a direction that lifts the distal end of the measuring arm upward, and a drop of the measuring arm in which the stylus may collide with the measured object can be suppressed.

As noted above, with the surface property measuring device disclosed in Japanese Patent No. 6133678, a drop of the measuring arm in which the stylus may collide with the measured object can be suppressed. However, in the surface property measuring device disclosed in Japanese Patent No. 6133678, the predetermined threshold value that serves as a decision reference for the position change speed of the measuring arm is a constant value, and therefore there is a possibility that the following unfavorable situations may occur. When the measurement speed of the measuring arm (speed of scanning operation of the measuring arm) is constant, when an inclination of the measured object is small, the measuring arm can track along the inclination, but when the inclination of the measured object is large and step-shaped, the measuring arm floats up from the inclined surface and a drop occurs. Meanwhile, for an inclined surface having the same inclination angle, the larger the measurement speed, the larger the position change speed of the measuring arm becomes, as well, in the end floating up from the inclined surface and a drop occurs. In response to these drops, a drop prevention function is provided by the surface property measuring device of Japanese Patent No. 6133678, but when the threshold value is a constant value, there is a possibility that the threshold value cannot adequately accommodate a variety of conditions. For example, when the threshold value is small, the drop prevention function works reliably for a variety of measurement speeds or inclination angles, but there is a possibility that a measurement task cannot be performed smoothly due to the drop prevention function acting frequently. Meanwhile, when the threshold value is large, the drop prevention function is inhibited, but there is a possibility that a situation may arise in which the drop prevention function does not work reliably.

SUMMARY OF THE INVENTION

An advantage of the present invention is to provide a surface property measuring device, and a control method for the device, in which a measurement task can be performed smoothly while reliably preventing a drop of a stylus on the basis of a variety of measurement conditions.

A surface property measuring device according to the present invention is equipped with a surface property measuring instrument that measures a surface property of a measured surface of a measured object by performing tracing scanning of the measured surface while in contact with the measured surface, a relative displacement mechanism that relatively displaces the surface property measuring instrument and the measured object in three dimensions such that the surface property measuring instrument performs tracing scanning along the measured surface, and a control device that controls operations of the surface property measuring instrument and the relative displacement mechanism. The surface property measuring instrument includes a measuring arm that is supported so as to be capable of circular arced movement with a rotary shaft as a pivot point, a stylus that is provided to a distal end of the measuring arm, a position change detector that detects a change in position due to the circular arced movement of the measuring arm, and a measurement force applier that biases the measuring arm in a circular arced movement direction and applies a measurement force to the stylus. The control device includes a measurement force instruction portion that outputs a measurement force instruction that issues an instruction for an orientation and size of the measurement force, and a measurement force controller that controls the orientation and size of the measurement force produced by the measurement force applier by applying a control signal to the measurement force applier. The measurement force controller sets a predetermined threshold value for a position change speed of the measuring arm in accordance with the measurement speed of the surface property measuring instrument relative to the measured object, monitors a position change detection signal from the position change detector, and when the position change speed of the measuring arm is equal to or less than the predetermined threshold value, applies the control signal to the measurement force applier so as to produce a measurement force with an orientation and size corresponding to the measurement force instruction, and when the position change speed of the measuring arm exceeds the predetermined threshold value, applies feedback so as to produce in the measurement force applier a force in a direction that lifts the distal end of the measuring arm upward.

In the surface property measuring device according to the present invention, preferably, the measurement force controller includes a measurement force instruction voltage generator that generates a measurement force instruction voltage that is a voltage signal that corresponds to a value of the measurement force instruction, a feedback signal generator that generates a feedback signal that is a voltage signal that produces in the measurement force applier a force in a direction that lifts the distal end of the measuring arm upward, a subtractor that subtracts the feedback signal from the measurement force instruction voltage, and a decision circuit that, based on the position change detection signal from the position change detector, decides whether the position change speed of the measuring arm exceeds the predetermined threshold value. Preferably, when the decision circuit decides that the position change speed of the measuring arm exceeds the predetermined threshold value, the feedback signal is input to the subtractor.

In the surface property measuring device according to the present invention, preferably, the feedback signal generator is configured by a frequency-voltage conversion circuit that generates a voltage signal that corresponds to a frequency value of the position change detection signal from the position change detector.

In the present invention, preferably, a switch mechanism is provided between the feedback signal generator and the subtractor, and the decision circuit sets the switch mechanism to ON when the position change speed of the measuring arm exceeds the predetermined threshold value, and sets the switch mechanism to OFF when the position change speed of the measuring arm is equal to or less than the predetermined threshold value.

In the surface property measuring device according to the present invention, preferably, when the switch mechanism is OFF, the surface property measuring instrument measures the surface property of the measured surface.

In the surface property measuring device according to the present invention, the measurement force controller stores a threshold value table showing a correspondence between the measurement speed and the threshold value.

A control method for a surface property measuring device according to the present invention is a control method for a surface property measuring device that is equipped with a surface property measuring instrument having a measuring arm that is supported so as to be capable of circular arced movement with a rotary shaft as a pivot point, a stylus that is provided to a distal end of the measuring arm, a position change detector that detects a change in position due to the circular arced movement of the measuring arm, and a measurement force applier that biases the measuring arm in a circular arced movement direction and applies a measurement force to the stylus; and a relative displacement mechanism that relatively displaces the surface property measuring instrument and a measured object in three dimensions such that the surface property measuring instrument performs tracing scanning along a measured surface of the measured object. In the control method, an orientation and size of the measurement force produced by the measurement force applier is controlled by applying to the measurement force applier a control signal that is based on a measurement force instruction that issues an instruction for the orientation and size of the measurement force; a predetermined threshold value for a position change speed of the measuring arm is set in accordance with the measurement speed of the surface property measuring instrument relative to the measured object; a position change detection signal from the position change detector is monitored, and when the position change speed of the measuring arm is equal to or less than the predetermined threshold value, the control signal is applied to the measurement force applier so as to produce a measurement force with an orientation and size corresponding to the measurement force instruction; and when the position change speed of the measuring arm exceeds the predetermined threshold value, feedback is applied so as to produce in the measurement force applier a force in a direction that lifts the distal end of the measuring arm upward.

According to the present invention, a drop of a measuring arm in which a stylus may collide with a measured object can be suppressed.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5 illustrates a relationship between measurement speed and a threshold value (drop detection speed) in the first embodiment;

FIG. 8 illustrates a scanning measurement of a measured surface where an inclination angle is gentle in the first embodiment.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings.

First Embodiment

Figure 1:
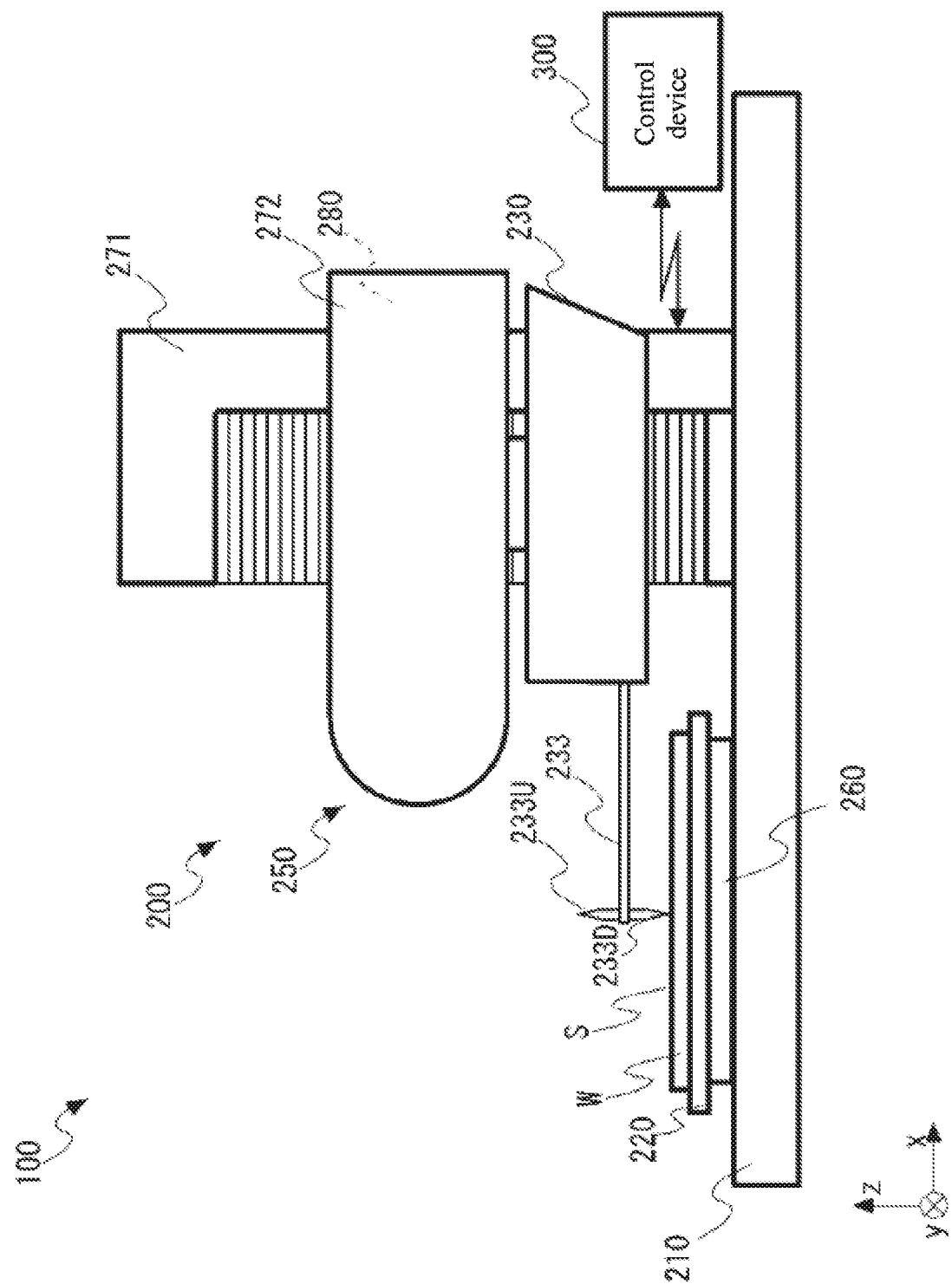
FIG. 1 illustrates a surface property measuring device according to a first embodiment of the present invention.

FIG. 1 illustrates a surface property measuring device 100. The surface property measuring device 100 includes a surface property measuring apparatus 200 and a control device 300. The actual configuration of the surface property measuring apparatus 200 is common knowledge, but a simple description is given here. The surface property measuring apparatus 200 includes a base 210, a stage 220 arranged on top of the base 210 and having a measured object (measurable object or object to be measured) W placed on a top surface thereof, a surface property measuring instrument 230 having a stylus that makes contact with a measured surface (measurable surface or surface to be measured) S and also detecting minute rises and dips of the stylus, and a relative displacement mechanism (relative displacement motor) 250 that causes relative displacement of the surface property measuring instrument 230 and the stage 220.

Relative Displacement Mechanism 250

First, the relative displacement mechanism 250 is described. The relative displacement mechanism 250 includes a Y axis drive mechanism 260, a Z axis drive mechanism 270, and an X axis drive mechanism 280. The Y axis drive mechanism 260 is provided between the base 210 and the stage 220, and displaces the stage 220 in one direction (Y axis direction) of the horizontal directions. In this example, the Y axis direction is defined as a direction perpendicular to the plane of the drawing sheet in FIG. 1. In addition, the Z axis drive mechanism 270 includes a Z column 271 standing upright on a top surface of the base 210 and a Z slider 272 provided so as to be capable of ascending and descending in a vertical direction (Z axis direction) on the Z column 271. Detailed illustrations of the Y axis drive mechanism 260 and the Z axis drive mechanism 270 are omitted, but the mechanisms may be configured by a feed screw mechanism having a ball screw shaft and a nut member that is threadably mounted on the ball screw shaft, for example. A Y direction position detector 261 (see FIG. 3) for detecting a relative change in position between the base 210 and the stage 220 is installed in the Y axis drive mechanism 260, and a Z direction position detector 273 (see FIG. 3) for detecting an amount of ascent and descent of the Z slider 272 is installed in the Z axis drive mechanism 270.

The X axis drive mechanism 280 is provided inside the Z slider 272 and displaces the surface property measuring instrument 230 in the X axis direction. The X axis direction is a left-right direction on the plane of the drawing sheet in FIG. 1. That is, the X axis direction is a direction that is orthogonal to the displacement direction of the stage 220 (Y axis direction) and the displacement direction of the Z slider 272 (Z axis direction).

Figure 2:
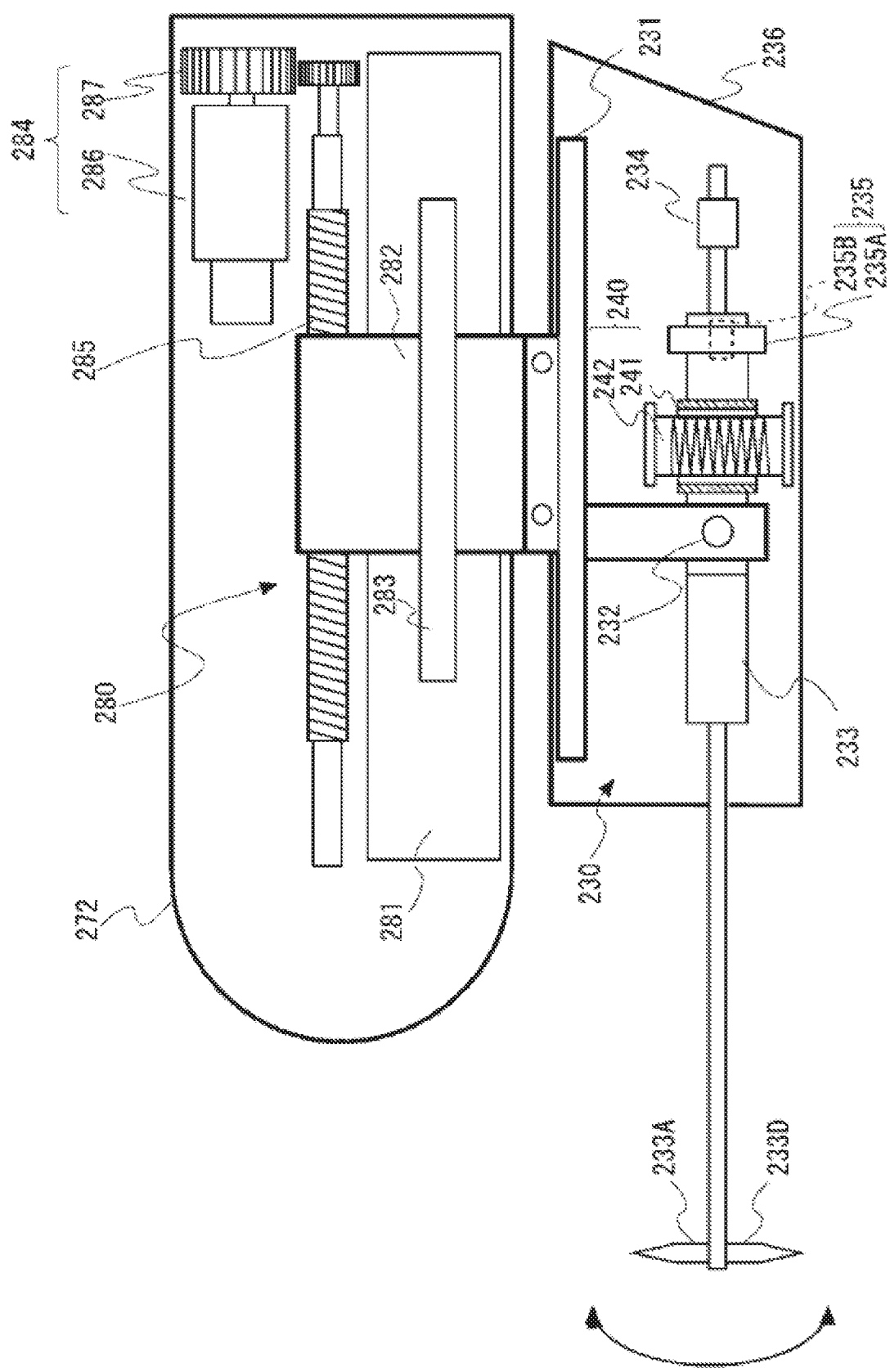
FIG. 2 illustrates a configuration of an X axis drive mechanism and a surface property measuring instrument in the first embodiment.

FIG. 2 is a diagram illustrating a configuration of the X axis drive mechanism and the surface property measuring instrument. In FIG. 2, the interior of the Z slider 272 and the interior of a casing 236 of the surface property measuring instrument 230 are illustrated. The X axis drive mechanism 280 includes a guide rail 281, an X slider 282, an X direction position detector 283, and a feed mechanism 284.

The guide rail 281 is fixedly provided along the X direction, and the X slider 282 is provided so as to be capable of sliding displacement over the guide rail 281. The X direction position detector 283 detects an X axis direction position of the X slider 282. The feed mechanism 284 includes a feed screw shaft 285, a motor 286, and a power transmission mechanism 287, and the feed screw shaft 285 and the X slider 282 are threadably mounted to each other. Rotary power of the motor 286 is transmitted to the feed screw shaft 285 via the power transmission mechanism 287. The X slider 282 displaces along the X axis direction due to the rotation of the feed screw shaft 285.

Surface Property Measuring Instrument 230

Next, a configuration of the surface property measuring instrument 230 is described. The surface property measuring instrument 230 includes a bracket 231, a measuring arm 233, styluses 233U and 233D, a balance weight 234, a position change detector 235, a measurement force applier 240, and the casing 236.

The bracket 231 is suspended from and supported on the X slider 282, and the measuring arm 233 is supported so as to be capable of oscillating (circular arced movement) in the vertical direction with a rotary shaft 232 as a pivot point. The styluses 233U and 233D are provided on a distal end (left end in FIG. 2) of the measuring arm 233, projecting perpendicularly relative to a length direction of the measuring arm 233. This example is configured with the stylus 233U provided facing upward and the stylus 233D provided facing downward. The balance weight 234 is provided on a base end side (right end in FIG. 2) of the measuring arm 233 so as to enable a position of the balance weight 234 to be adjusted.

The position change detector 235 detects an amount of circular arced movement of the measuring arm 233 (amount of change in position in the Z axis direction). The position change detector 235 includes a scale 235A having scale marks (not shown in the drawings) that are curved along the direction of the circular arced movement of the measuring arm 233 and a detection head 235B that is provided opposite the scale 235A. The scale 235A is fixed to the measuring arm 233 at the base end side of the measuring arm 233 so as to change position integrally with the measuring arm 233. In addition, the detection head 235B is fixedly deployed on the bracket 231 by a support member not shown in the drawings. The circular arced movement of the measuring arm is detected by the detection head 235B, and the detection head 235B outputs a number of pulse signals (position change detection pulse signals) that corresponds to the amount of circular arced movement of the measuring arm 233.

The measurement force applier 240 is a voice coil motor arranged toward the base end of the measuring arm 233, and applies force to the measuring arm 233 such that the distal end of the measuring arm 233 is biased in an up direction or a down direction. The measurement force applier 240 is configured by a magnet 241 and a voice coil 242. The magnet 241 has a cylindrical shape and is provided midway on the measuring arm 233. The voice coil 242 is arranged such that the magnet 241 runs therethrough. The voice coil 242 is fixedly provided and may, for example, be fixed to the bracket 231.

When electric current flows through the voice coil 242, magnetic force is produced in the voice coil 242. When this happens, the distal end of the measuring arm 233 is biased in the up direction or down direction by an interaction of the voice coil 242 and the magnet 241. At this time, when the amperage (electric current value) flowing through the voice coil 242 changes, the strength of the biasing force applied to the measuring arm changes. Accordingly, a measurement force applier that both applies a contact force between the stylus and the measured surface S (that is, the measurement force) and modifies that force is achieved by this configuration.

In addition, by switching the direction of the electric current flowing through the voice coil 242, the direction of the biasing force applied to the measuring arm 233 is switched. For example, where the distal end of the measuring arm 233 has been biased upward, this means the biasing changes to downward. Accordingly, the measurement force applier 240 also acts as a measurement posture switcher.

In the configuration above, the surface property measuring instrument 230 can be relatively displaced in three dimensions relative to the measured object W by the relative displacement mechanism 250 (Y axis drive mechanism 260, Z axis drive mechanism 270, and X axis drive mechanism 280). Also, the surface property measuring instrument 230 performs scanning displacement along the measured surface S while the styluses 233U and 233D of the surface property measuring instrument 230 are in contact with the measured surface S. Minute rises and dips of the styluses 233U and 233D at this time are detected by the position change detector 235 as an amount of oscillation of the measuring arm 233. Accordingly, not only is a contour shape of the measured object measured, but a surface property (minute unevenness, surface roughness, undulation) of the measured surface can also be measured.

In this example, the measuring arm 233 of the surface property measuring instrument 230 oscillating crisply in accordance with fine unevenness in the measured surface is demanded. Accordingly, the measuring arm 233 cannot be fixedly supported. In a state axially supported by the rotary shaft 232 so as to be capable of oscillating, the measuring arm 233 is supported while finely maintaining its balance due to the balance weight 234, the biasing force from the measurement force applier 240, and the opposing force from the measured surface.

Control Device 300

Figure 3:
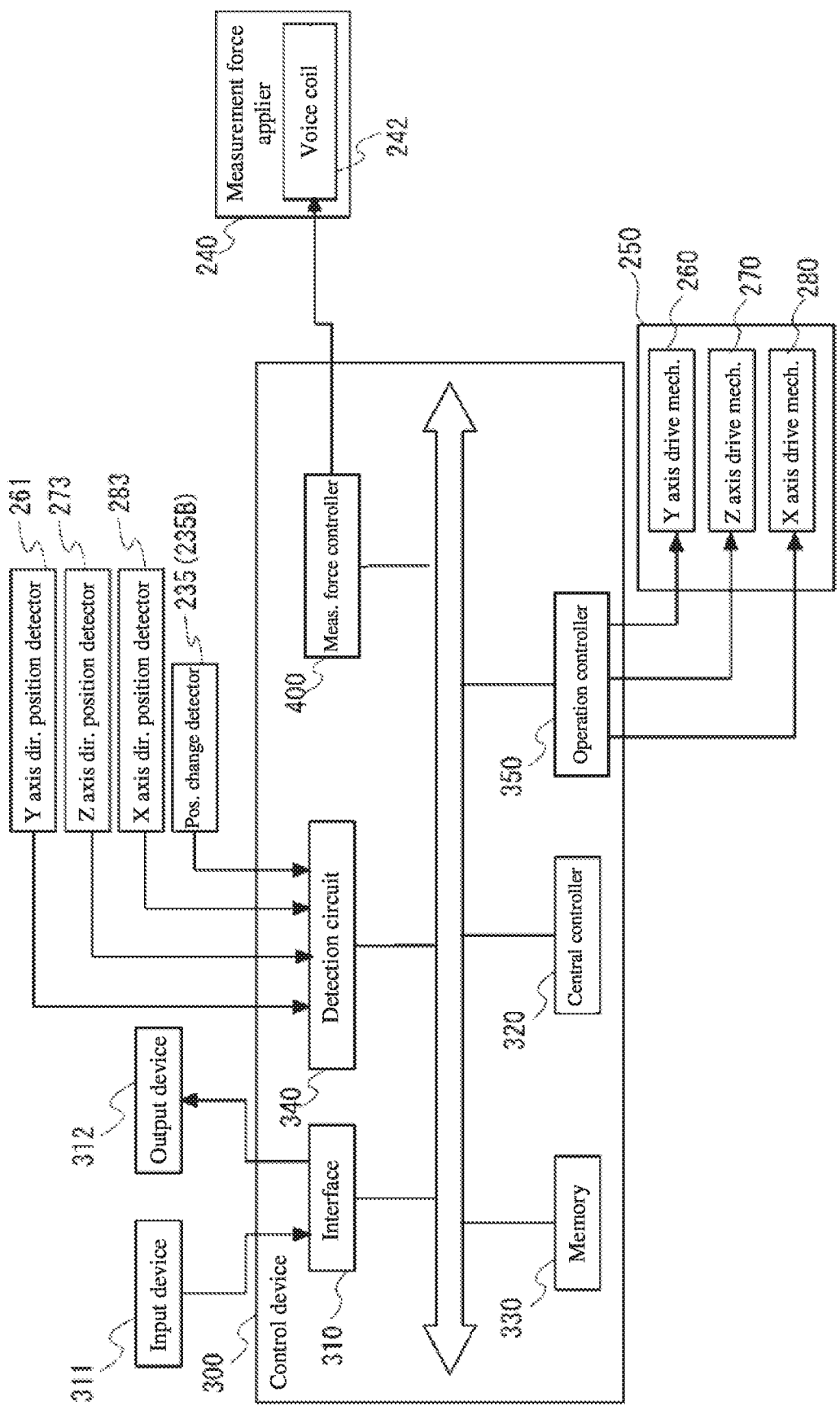
FIG. 3 is a functional block diagram for a control device according to the first embodiment.

FIG. 3 is a functional block diagram for the control device 300. The control device 300 includes an interface portion 310, a central controller (measurement force instruction portion) 320, a memory 330, a detection circuit portion 340, an operation controller 350, and a measurement force controller (measurement force control circuit) 400.

The control device 300 is connected to an external input device 311 and output device 312 via the interface portion 310. In addition to a keyboard or mouse, the input device 311 may also be various kinds of data readers. In addition to a display device or printer, the output device 312 may also be various kinds of calculation devices that find a measured surface shape using data calculation.

The central controller 320 is known as a central processing unit (CPU), and comprehensively manages overall operations of the control device 300. The memory 330 may be a ROM or RAM or other storage, and stores various kinds of operation control programs, and also serves as a buffer during data input and output.

The detection circuit portion 340 detects signals (for example, pulse signals) from the Y direction position detector 261, the Z direction position detector 273, the X direction position detector 283, and the position change detector 235, and externally outputs the signals as measurement data via the interface portion 310.

The operation controller 350 applies a drive signal to the Y axis drive mechanism 260, the Z axis drive mechanism 270, and the X axis drive mechanism 280, and causes the surface property measuring instrument 230 to perform scanning displacement along the measured surface S. That is, the operation controller 350 receives an instruction from the central controller 320 and outputs a drive pulse to the respective Y axis drive mechanism 260, Z axis drive mechanism 270, and X axis drive mechanism 280.

Measurement Force Controller 400

Figure 4:
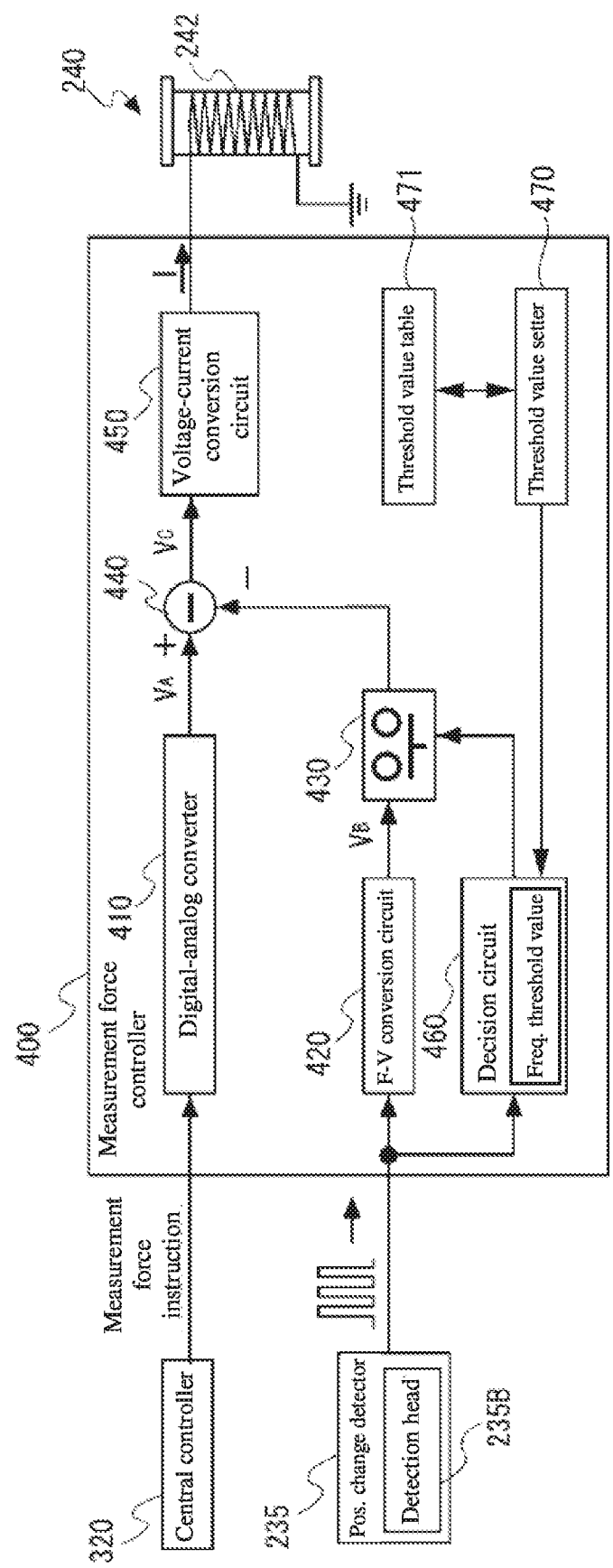
FIG. 4 is a functional block diagram for a measurement force controller according to the first embodiment.

The measurement force controller 400 is now described. FIG. 4 is a functional block diagram for a measurement force controller. The measurement force controller 400 controls the size and orientation of the measurement force by controlling a control current I applied to the voice coil 242 of the measurement force applier 240. A measurement force instruction from the central controller 320 and a position change detection pulse from the position change detector 235 are input to the measurement force controller 400, which controls a value of the control current I applied to the voice coil 242 based on the measurement force instruction and the position change detection pulse.

The measurement force controller 400 includes a digital-analog converter (measurement force instruction voltage generator) 410, a frequency-voltage conversion circuit (feedback signal generator) 420, a switch mechanism (switch) 430, a subtracting device (subtractor) 440, a voltage-current conversion circuit 450, a decision circuit 460, and a threshold value setter 470.

The digital-analog converter 410 receives the measurement force instruction from the central controller 320 and outputs a voltage signal VA that corresponds to the measurement force instruction. At this point, the digital-analog converter 410 configures a measurement force instruction voltage generator. The voltage signal VA is input to an addition-side terminal of the subtracting device 440. What is referred to herein as a measurement force instruction includes an instruction for the size of the measurement force (contact stress) with which the styluses 233U and 233D press against the measured surface S, as well as an instruction for a direction of a biasing force (measurement posture)

indicating whether the distal end of the measuring arm 233 biases upward or downward. In addition, when the shape of the measured object is known based on design data for the measured object, for example, the central controller 320 generates a measurement force instruction such that the styluses 233U and 233D perform a tracing scan over the surface of the measured object with a constant measurement force. At this point, the central controller 320 configures a measurement force instruction portion. In addition, the voltage signal VA is a signal in which the measurement force instruction from the central controller 320 is converted to a corresponding voltage value, and therefore, in the present invention, the voltage signal VA from the digital-analog converter 410 may be referred to as a measurement force instruction voltage.

The position change detection pulse from the position change detector 235 is input to the frequency-voltage conversion circuit 420. The frequency-voltage conversion circuit 420 outputs a voltage signal VB that corresponds to the frequency of the position change detection pulse. The position change detector 235 detects an amount of circular arced movement of the measuring arm 233, and so when the circular arced movement of the measuring arm 233 becomes quicker, the frequency of the position change detection pulse increases. Conversely, when the circular arced movement of the measuring arm 233 becomes slower, the frequency of the position change detection pulse decreases. Accordingly, when the circular arced movement of the measuring arm 233 becomes quicker, the voltage signal VB from the frequency-voltage conversion circuit 420 increases, and when the circular arced movement of the measuring arm 233 becomes slower, the voltage signal VB from the frequency-voltage conversion circuit 420 decreases. In other words, the voltage signal VB is equivalent to a feedback signal in which the speed of the circular arced movement of the measuring arm 233 is converted to a voltage. Accordingly, in the present specification, the voltage signal VB from the frequency-voltage conversion circuit 420 may be referred to as a feedback voltage signal. At this point, the frequency-voltage conversion circuit 420 configures a feedback signal generator.

The switch mechanism 430 is provided between the frequency-voltage conversion circuit 420 and the subtracting device 440, and the voltage signal VB from the frequency-voltage conversion circuit 420 is input to a subtraction-side terminal of the subtracting device 440 via the switch mechanism 430. The switch mechanism 430 is ON-OFF controlled in accordance with a decision result of the decision circuit 460, which is described in detail below. The switch mechanism 430 may also be a semiconductor switch such as a MOSFET, for example, or may of course be a mechanical switch.

The subtracting device 440 subtracts the voltage signal VB from the voltage signal VA to generate a voltage signal VC and outputs the voltage signal VC to the voltage-current conversion circuit 450. The voltage signal VA refers to a voltage signal that is output from the digital-analog converter 410 in response to the measurement force instruction. The voltage signal VB refers to a voltage signal (feedback voltage signal) that is output from the frequency-voltage conversion circuit 420 in accordance with the speed of the circular arced movement of the measuring arm 233. Also, the voltage signal VC that is generated by subtracting the voltage signal VB from the voltage signal VA is a control voltage signal that controls the orientation and size of the force produced by the measurement force applier.

The voltage-current conversion circuit 450 generates the control current I that corresponds to a voltage level of the control voltage signal (voltage signal VC) and applies the control current I to the voice coil 242.

The decision circuit 460 performs ON-OFF control of the switch mechanism 430. The position change detection pulse from the position change detector 235 is input to the decision circuit 460, and the decision circuit 460 switches the switch mechanism 430 between ON and OFF in response to how high or low the frequency of the position change detection pulse is. The decision circuit 460 sets a predetermined frequency threshold value using the threshold value setter 470, and the decision circuit 460 decides whether the position change detection pulse exceeds the frequency threshold value. Also, when the frequency of the position change detection pulse exceeds the frequency threshold value, the decision circuit 460 sets the switch mechanism 430 to ON (closed). When the switch mechanism 430 is ON (closed), the feedback voltage signal (voltage signal VB) is input to the subtracting device 440. Meanwhile, when the frequency of the position change detection pulse is equal to or less than the frequency threshold value, the decision circuit 460 sets the switch mechanism 430 to OFF (open). When the switch mechanism 430 is OFF (open), the feedback voltage signal (voltage signal VB) is no longer input to the subtracting device 440.

The threshold value setter 470 sets the predetermined frequency threshold value in the decision circuit 460, and at the time of setting the value, the predetermined frequency threshold value is set in accordance with the measurement speed (displacement speed in a scanning direction). The measurement speed used in setting the frequency threshold value can utilize the measurement speed input via the input device 311 when a user sets various measurement conditions (measurement speed target value), or can utilize the measurement speed that is detected by the detection circuit portion 340 (measurement speed measured value). In order to set the predetermined frequency threshold value in accordance with the measurement speed, a threshold value table 471 that assigns data for a correspondence relationship between measurement speed and threshold value is connected to the threshold value setter 470.

FIG. 5 depicts a relationship of the measurement speed of the measuring arm 233 to a threshold value (drop detection speed), maximum tracking angle, and drop detection distance. In a range where the measurement speed is low (0.02 to 2.00 mm/s), tracking ability of the measuring arm 233 with respect to the measured object is high and the maximum tracking angle is large at 830. Therefore, the threshold value for a measurement speed that is 0.02 to 1.00 mm/s is set to 10 mm/s, and the threshold value for a measurement speed that is 2.00 mm/s is set to a comparatively small value of 20 mm/s. In addition, the drop detection distance should also be small at 0.5 mm and 1.2 mm, respectively. In a range where the measurement speed is high (5.00 to 30.00 mm/s), tracking ability of the measuring arm 233 with respect to the measured object is lower, and so as the measurement speed increases, the maximum tracking angle gradually becomes smaller at 81° to 45°. In this range, the threshold value is set to a comparatively high 30 mm/s. In addition, the drop detection distance is set at 2.1 mm. The smaller the drop distance, the less the risk of stylus breakage, and therefore in this range, using a consistent value could also be said to limit the risk.

Of the correlations in FIG. 5, the relationship between the measurement speed and the threshold value is recorded in the threshold value table 471. Based on the measurement speed instructed by the user or the measurement speed detected by the detection circuit portion 340, the threshold value setter 470 retrieves the corresponding threshold value from the threshold value table 471, and sets a frequency corresponding to that threshold value (drop detection speed) as the frequency threshold value in the decision circuit 460. Accordingly, in the decision circuit 460, a drop inhibition function can be launched by drop detection corresponding to the scanning speed (measurement speed) of the measuring arm 233.

Operations of the First Embodiment

Next, operations of the present embodiment having the above-noted configuration are described. The basic operations to perform a scanning measurement are the same as in the existing technology, so the following description focuses on the operations of the measurement force controller 400 which is a characteristic portion of the present embodiment. Several representative scenarios that appear during measurement operations are used as examples in discussing the operations of the measurement force controller 400.

Operation to Switch the Measurement Direction (Measurement Posture)

Figure 6A:
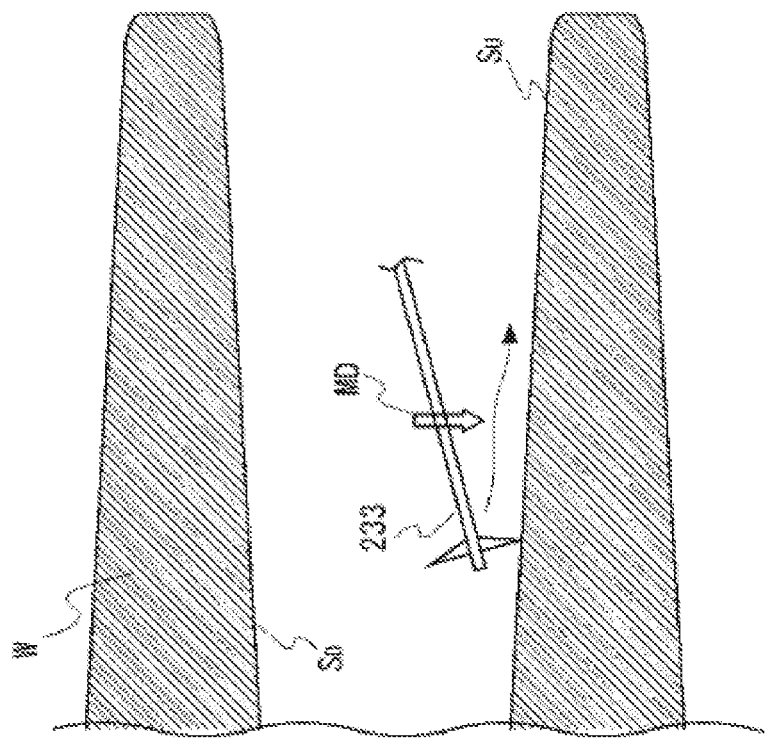
FIGS. 6A and 6B illustrate continuous measurement of a measured object W having a downward-facing surface SD and an upward-facing surface SU in the first embodiment.
Figure 6B:
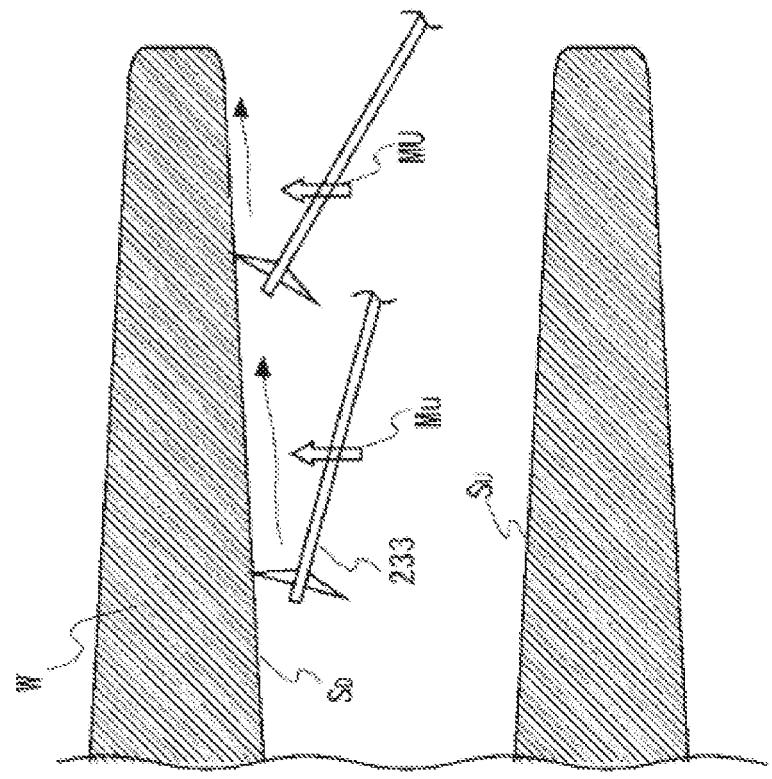

There are scenarios where, when measuring the surface of the measured object, the measurement direction (measurement posture) is switched. As illustrated in FIGS. 6A and 6B, for example, the measured object W includes a downward-facing surface SD and an upward-facing surface SU as measured surfaces, and in some cases after scanning measurement of the downward-facing surface SD is performed (FIG. 6A), scanning measurement of the upward-facing surface SU (FIG. 6B) may be performed next. In such a case, when performing scanning measurement of the downward-facing surface SD (FIG. 6A), an upward biasing force (measurement force) must be applied to the distal end of the measuring arm 233 (arrow MU in FIG. 6A), and when performing scanning measurement of the upward-facing surface SU (FIG. 6B), a downward biasing force (measurement force) MD must be applied to the distal end of the measuring arm 233. Accordingly, when transitioning from the state of FIG. 6A to the state of FIG. 6B, the direction of the measurement force is switched from upward (MU) to downward (MD).

In the present invention, there is no need to strictly define whether the measured surface S is downward or upward, but for example, when a normal vector running from a single point on the measured surface S into space has a component that is oriented downward in a perpendicular direction, the measured surface S should be treated as the downward-facing surface SD. Conversely, when a normal vector running from a single point on the measured surface S into space has a component that is oriented upward in the perpendicular direction, the measured surface S should be treated as the upward-facing surface SU.

Figure 7A:
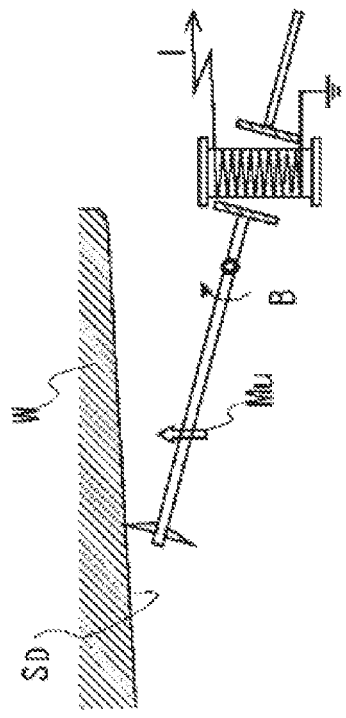
FIGS. 7A and 7B illustrate the mathematical signs positive and negative for a signal in the first embodiment.
Figure 7B:
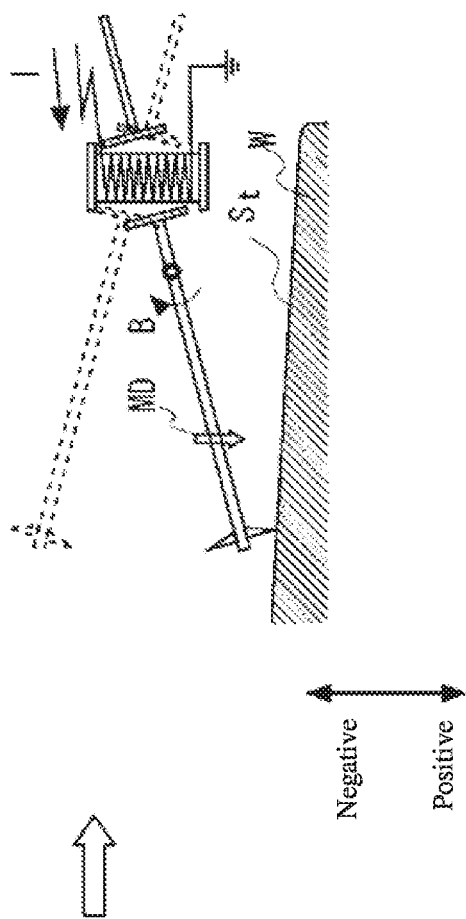

For ease of explanation, a mathematical sign of the measurement force instruction when the measurement force is upward (MU) is defined as negative. In this state, the direction of the control current I flowing through the voice coil 242 is defined as negative (please see FIG. 7A). Next, as in FIG. 7B, the mathematical sign of the measurement force instruction when the measurement force is switched to downward (MD) is defined as positive. In this state, the direction of the control current I flowing through the voice coil 242 is defined as positive (please see FIG. 7B). When transitioning from the state of FIG. 7A to the state of FIG. 7B, the direction of the control current I flowing through the voice coil 242 becomes reversed. When the mathematical sign of the measurement force instruction is reversed, the downward biasing force (measurement force) MD is suddenly applied to the distal end of the measuring arm 233. Moreover, gravity is also applied to the measuring arm 233, and so the measuring arm may abruptly shift downward, but at this point, the present embodiment is configured such that feedback is applied and a position change speed of the measuring arm 233 is constrained to a predetermined value or lower.

A method can exist in which the current flowing through the voice coil 242 is gradually reduced to reach 0, and then gradually a positive current starts to flow. However, even in this case, when the current flowing through the voice coil 242 reaches 0, for example, a force supporting the weight of the measuring arm 233 may be eliminated, and so in that moment the measuring arm drops due to gravity and abruptly changes position downward.

The description now follows a flow of signals in order. When switching the measurement force from upward (MU) to downward (MD), the measurement force instruction from the central controller 320 switches from a negative to a positive value. The measurement force instruction is converted by the digital-analog converter 410 to an analog voltage signal VA corresponding to an instruction value and is output. The mathematical sign of the voltage instruction value (voltage signal VA) when the measurement force instruction is positive is defined as positive. The voltage signal VA is input to the voltage-current conversion circuit 450 via the subtracting device 440, and is applied to the voice coil 242 as the control current I corresponding to the size of the voltage signal VA. In this way, when the control current I corresponding to the measurement force instruction is applied to the voice coil 242, the downward biasing force (measurement force) MD is applied to the distal end of the measuring arm 233. The downward biasing force (measurement force) MD and gravity are applied to the distal end of the measuring arm 233, and so the distal end of the measuring arm 233 abruptly changes position downward.

In that moment, the rapid (downward) change in position of the distal end of the measuring arm 233 is detected by the position change detector 235, and a detected position change detection pulse is input to the frequency-voltage conversion circuit 420 and the decision circuit 460. In this example, the distal end of the measuring arm 233 rapidly changes position downward, and the frequency of the position change detection pulse is rather high, and exceeds the frequency threshold value.

In such a case, the decision circuit 460 decides that the frequency of the position change detection pulse exceeds the frequency threshold value and sets the switch mechanism 430 to ON (closed). At the same time, the frequency-voltage conversion circuit 420 converts the frequency of the position change detection pulse to the corresponding voltage signal VB. The voltage signal VB that is generated in this way is input to the subtraction-side terminal of the subtracting device 440.

In the subtracting device 440, the control voltage signal (voltage signal VC) is defined by subtracting the feedback voltage signal (voltage signal VB) from the measurement force instruction voltage (voltage signal VA) and generated. At this point, the feedback voltage signal (voltage signal VB) returns to the negative, and therefore produces an opposite action with respect to the down-direction change in position (or drop) of the distal end of the measuring arm 233. That is, the feedback voltage signal (voltage signal VB) has an effect of lifting the distal end of the measuring arm 233 in the up direction (arrow B in FIG. 7B), and accordingly a sudden down-direction change in position (drop) of the distal end of the measuring arm 233 is constrained. In this way, the measurement posture of the measuring arm 233 can shift at a predetermined speed or less from a state where the upward biasing force is applied to a state where the downward biasing force is applied.

During Scanning Measurement Operation (Part 1)

Next, operations during scanning measurement of the measured surface S are described. First, as in FIG. 8, a case is considered where an inclination angle of the measured surface is gentle and equal to or less than a tracking limit angle. In order to provide a comparative description hereafter, the measured surface is the upward-facing surface SU. When the inclination angle is gentle and equal to or less than the tracking limit angle, the measurement operation is similar to known examples.

At the beginning of scanning measurement, first, as illustrated in FIG. 8, the stylus 233D is brought into contact with the upward-facing surface SU at a predetermined measurement force MD. At this point, the central controller 320 reads the design data of the measured object W stored in the memory 330 and a measurement parts program defined ahead of time, and based on these sends an instruction to the operation controller 350 to displace the stylus 233D to a measurement start point. The operation controller 350 drives the Y axis drive mechanism 260, the Z axis drive mechanism 270, and the X axis drive mechanism 280 and causes the surface property measuring instrument 230 to displace. Once the stylus 233D arrives directly above the measurement start point, the central controller 320 sends an instruction producing a constant measurement force to the measurement force controller 400.

In this example, the measured surface S is the upward-facing surface SU, and so the central controller 320 sends a measurement force instruction to the measurement force controller 400 to bias the distal end of the measuring arm 233 downward. The operation that biases the distal end of the measuring arm 233 downward according to the measurement force instruction that produces the downward biasing force is the same as the "operation to switch the measurement direction" described above. That is, feedback is applied with reference to a sudden down-direction change in position (drop) of the measuring arm 233, and the distal end of the measuring arm 233 changes position in the down direction gradually at the predetermined speed or less.

Also, as illustrated in FIG. 8, the stylus 233D contacts the upward-facing surface SU. At this point, the force of gravity from the weight of the measuring arm 233 itself and the downward biasing force from the measurement force applier (voice coil motor) 240 are combined and applied downward on the stylus 233D. In addition, the upward opposing force from the upward-facing surface SU is applied to the stylus 233D. Accordingly, the distal end of the stylus 233D and the upward-facing surface SU contacts a predetermined measurement force. By applying the upward opposing force from the upward-facing surface SU, the measuring arm 233 is supported from below, and of course is prevented from dropping.

When performing scanning measurement in the X direction along the upward-facing surface SU (from left to right in the plane of the drawing sheet of FIG. 8), based on the design data of the measured object and the preset measurement parts program, a displacement instruction for displacement in the X direction and Z direction is sent from the central controller 320 to the operation controller 350. Thereupon, the stylus 233D (measuring arm 233) performs scanning displacement in the X direction along the upward-facing surface SU through driving of the X axis drive mechanism 280 and the Z axis drive mechanism 270. Amounts of drive of the X axis drive mechanism 280 and the Z axis drive mechanism 270 are respectively detected by the X direction position detector 283 and the Z direction position detector 273, and each detected value is collected by the detection circuit portion 340. Moreover, the stylus 233D rises and dips due to minute unevenness or undulation of the upward-facing surface SU, and these vertical fluctuations are detected by the position change detector 235 as circular arced movement of the measuring arm 233. The detection signal from the position change detector 235 (position change detection pulse signal) is also collected by the detection circuit portion 340. The detected values collected by the detection circuit portion 340 are output externally from the output device 312 as measurement data.

In this example, even when there is an incline to the upward-facing surface SU shown in FIG. 8, the inclination angle is gentle. Accordingly, while the X axis drive mechanism 280 induces scanning displacement of the surface property measuring instrument 230 in the X direction, the surface property measuring instrument 230 is raised and lowered in the Z axis direction by the Z axis drive mechanism 270, and thereby the surface property measuring instrument 230 can be made to track the upward-facing surface SU. By doing this, the stylus 233D maintains contact with the upward-facing surface SU while keeping the predetermined measurement force. At this point, the stylus 233D shifts slightly up and down due to the minute unevenness and undulations of the upward-facing surface SU, but the position change speed is minor. The circular arced movement of the measuring arm 233 is detected by the position change detector 235, and the position change detection pulse thereof is input to the frequency-voltage conversion circuit 420 and decision circuit 460 of the measurement force controller 400. When the inclination angle of the upward-facing surface SU is equal to or less than the tracking limit angle, the frequency of the position change detection pulse does not exceed the frequency threshold value in the threshold value decision in the decision circuit 460. Accordingly, the switch mechanism 430 remains OFF (open); that is, feedback control is suspended. In such a case, the control current I that is based on the measurement force instruction from the central controller 320 is only applied to the measurement force applier 240, and so scanning measurement with the predetermined measurement force according to the instruction is executed.

During Scanning Measurement Operation (Part 2)

Figure 9:
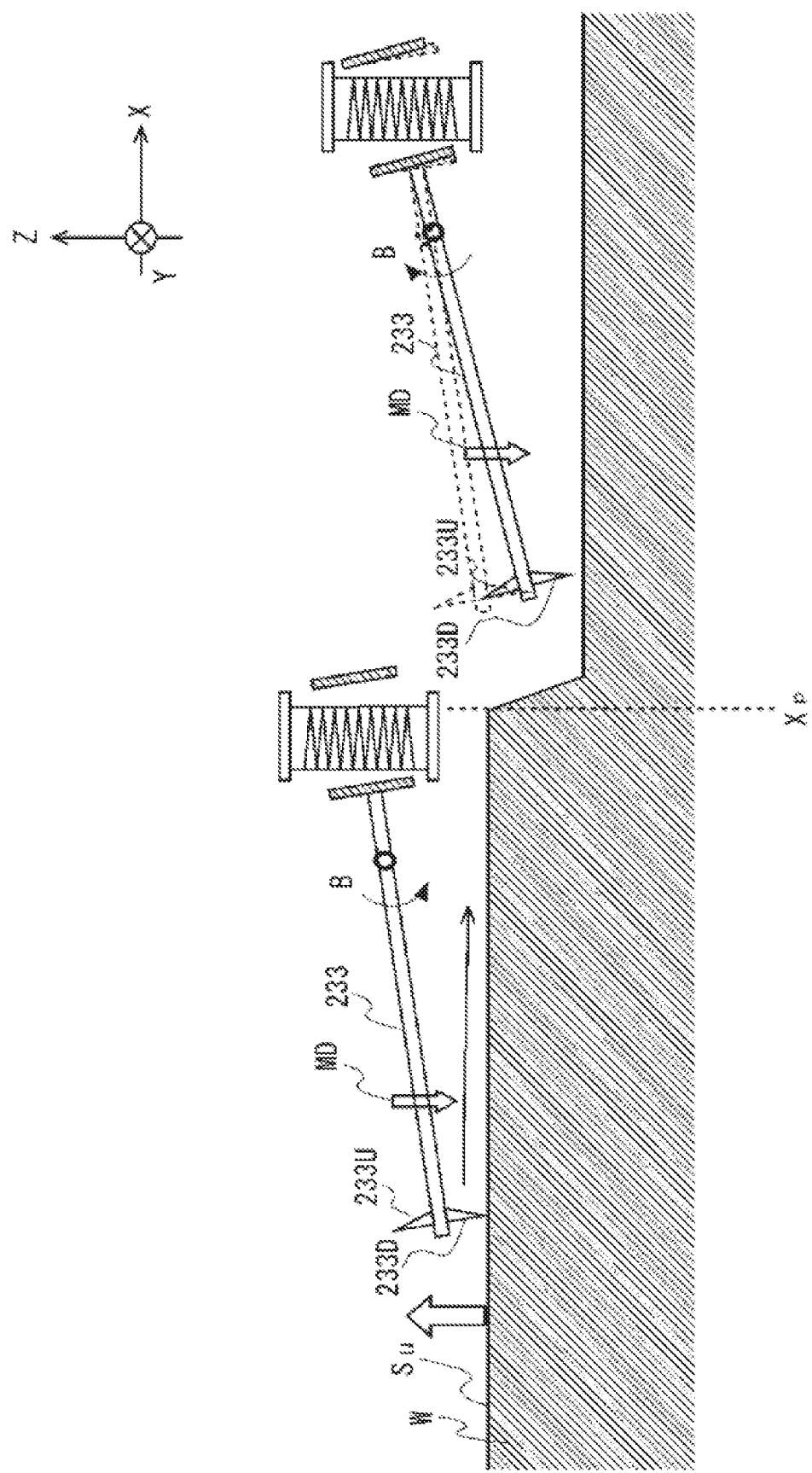
FIG. 9 illustrates a scanning measurement of a measured surface having a step with a large inclination angle in the first embodiment.

Next, a case is considered where the measured surface S has a step with a large inclination angle, and the inclination angle of the step exceeds the tracking limit angle. Past a point Xp, the upward-facing surface SU illustrated in FIG. 9 has a step with a large inclination angle. The stylus 233D undergoes scanning displacement from a start point and up to where the stylus 233D reaches the point Xp, the process is as described in "During Scanning Measurement Operation (Part 1)" above.

Past the point Xp, the stylus 233D encounters the step. The inclination angle of the step is too large, and raising and lowering operations by the Z axis drive mechanism 270 do not occur in time with respect to the scanning speed from the X axis drive mechanism 280. When this happens, the surface property measuring instrument 230 cannot track along the upward-facing surface SU, and the stylus 233D separates from the upward-facing surface SU. When this happens, an upward opposing force from the upward-facing surface SU is eliminated, and so the measuring arm 233 begins to drop.

When the measuring arm 233 begins to drop, the distal end of the measuring arm 233 abruptly changes position downward. However, in that moment, the rapid downward change in position of the distal end of the measuring arm 233 is detected by the position change detector 235, and the detected position change detection pulse is input to the frequency-voltage conversion circuit 420 and the decision circuit 460. Then, the decision circuit 460 decides that the frequency of the position change detection pulse exceeds the frequency threshold value and sets the switch mechanism 430 to ON (closed). At the same time, the frequency-voltage conversion circuit 420 converts the frequency of the position change detection pulse to the corresponding feedback voltage signal (voltage signal VB). Accordingly, in the subtracting device 440, the control voltage C is defined by subtracting the feedback voltage signal (voltage signal VB) from the measurement force instruction voltage (voltage signal VA) and generated. With this feedback voltage signal (voltage signal VB), a force that lifts the distal end of the measuring arm 233 in the up direction (arrow B in FIG. 9) is produced in the measurement force applier (voice coil motor) 240, and accordingly a sudden down-direction change in position (drop) of the measuring arm 233 is inhibited. In this way, even when the inclination angle of the upward-facing surface SU is too large and the stylus 233D separates from the upward-facing surface SU, the measuring arm 233 does not drop. That is, a situation is prevented where the stylus 233D collides with the upward-facing surface SU due to the measuring arm 233 dropping.

When feedback is applied and a sudden down-direction change in position (drop) of the measuring arm 233 is inhibited, the feedback voltage signal (voltage signal VB) output from the frequency-voltage conversion circuit 420 gradually decreases. Also, when the frequency of the position change detection pulse is equal to or less than the frequency threshold value, the decision circuit 460 sets the switch mechanism 430 to OFF (open). Accordingly, the loop of the feedback control automatically turns OFF. In this way, the distal end of the measuring arm 233 is constrained from impacting the upward-facing surface SU and makes contact (lands), after which the loop of the feedback control turns OFF, and so measurement at the predetermined measurement force restarts.

When the decision circuit 460 detects that the frequency of the position change detection pulse exceeds the frequency threshold value, the present embodiment may also be configured such that that information is reported to the central controller 320, and so as to interrupt the measurement operation by an instruction from the central controller 320.

Effects of the First Embodiment

The following beneficial effects are achieved with the first embodiment having the above-noted configuration.

(1) The position change detection pulse detected by the position change detector 235 is fed back to the frequency-voltage conversion circuit 420 and the decision circuit 460, and when the frequency of the position change detection pulse exceeds the frequency threshold value, the feedback is turned ON (closed). Accordingly, even when the measuring arm 233 begins an abrupt dropping motion, the drop is immediately suppressed, and an accident where the stylus 233D collides with the measured object W due to the drop can be avoided.

(2) In the present embodiment, the decision circuit 460 and the switch mechanism 430 are provided, and only when the frequency of the position change detection pulse exceeds the frequency threshold value, the embodiment is configured to set the switch mechanism 430 to ON (open). That is, the present embodiment is configured such that the feedback control is OFF when performing a normal scanning measurement operation, and the feedback control turns ON (closed) only when necessary. When the feedback control is set to be ON constantly, drops of the measuring arm 233 can be reliably prevented, and the decision circuit 460 and the switch mechanism 430 may also be considered unnecessary (Japanese Patent Laid-open Publication No. 2012-225742 discloses a measurement posture/measurement force control circuit that does not have a decision circuit or switch mechanism). However, when the feedback control is set to be ON constantly, there may be fluctuation in the control current I that is applied to the measurement force applier (voice coil motor) 240 each time there is a minute up or down movement of the styluses 233D and 233U. This may cause fluctuation in the measurement force, and may also potentially be linked to measurement error. In addition, when the feedback control is set to be ON constantly, response delay must be anticipated, and so scanning speed cannot be very fast, and increasing measurement efficiency is also difficult. In this regard, in the present embodiment, the decision circuit 460 and the switch mechanism 430 are provided, and while a normal scanning measurement is being performed, the feedback control is turned OFF (open). Accordingly, during normal scanning measurement, there is a constant measurement force that accords with the measurement force instruction from the central controller 320, and this is linked to stable measurement results. In addition, even when the feedback control turns ON due to a drop, the feedback control automatically turns OFF at the time of landing, and so after landing, measurement at a constant measurement force can restart immediately. Accordingly, even when there is a step in the measured object W and the measuring arm 233 drops due to the step, measurement restarts after landing on the lower level surface, and so the surface of each level can be continuously measured. Measurement through-put of a measured object W having a step can be improved.

(3) In the present embodiment, the threshold value setter 470 sets a threshold value in the decision circuit 460 that corresponds to the measurement speed of the measuring arm 233, and therefore a drop detection speed can be modified in response to the measurement speed. At this time, besides the user being able to arbitrarily set the measurement speed that serves as a reference, the scanning speed (measurement speed) of the measuring arm 233 that is detected by the detection circuit portion 340 can be constantly monitored, a corresponding threshold value can be retrieved from the threshold value table 471 based on the detected measurement speed, and that threshold value can be set in the decision circuit 460. Therefore, in the decision circuit 460, a drop inhibition function can be launched by drop detection corresponding to the actual scanning speed (measurement speed) of the measuring arm 233. As a result, a drop of the stylus 233D can be reliably prevented on the basis of various measurement conditions, while a measurement task can be performed smoothly.

Second Embodiment

In the first embodiment described above, control is performed in which the frequency of the position change detection pulse signal output from the position change detector is monitored, and when this frequency exceeds a predetermined frequency threshold value, feedback control is turned ON (closed). In the present embodiment, rather than the monitoring target being "the frequency of the position change detection pulse signal," a position change speed of the measuring arm (that is, the position change speed of the styluses 233U and 233D) may be monitored instead. That is, a displacement speed that includes a displacement direction that is downward or upward may be taken as the monitoring target, and when the measuring arm (synonymous with "the stylus 233D") is detected to have dropped downward at a predetermined speed threshold value or more, the feedback control may be turned ON (closed). In such a case, rather than feeding the position change detection pulse signal output from the position change detector back to a measurement force controller without modification, the signal is instead converted to a value for speed by the detection circuit portion 340 and then fed back to the measurement force controller, for example. In addition, rather than a frequency-voltage conversion circuit, a speed-voltage conversion circuit that outputs a voltage that corresponds to a speed value is applied instead. It is understood that even in such a modification, the drop of the measuring arm 233 (styluses 233U and 233D) can be detected and a sudden down-direction change in position (drop) of the measuring arm 233 (styluses 233U and 233D) can be suppressed.

When comparing the first embodiment with the second embodiment, the first embodiment can be considered preferable. When the position change detection pulse signal is used without modification as the feedback signal, as in the first embodiment, response speed is extremely fast. Meanwhile, when a process of converting the position change detection pulse signal to speed is introduced as in the second embodiment, response becomes that much slower. With only the magnitude of the frequency of the position change detection pulse signal, not even the orientation that indicates whether the measuring arm 233 (styluses 233U and 233D) are changing position upward or dropping down can be known. However, in situations where the measuring arm 233 suddenly changes position unintentionally, a drop due to gravity is the primary cause, and when the measuring arm 233 (stylus 233D) drops due to gravity, there is a risk that the drop will be linked to a collision with the measured object W.

Conversely, consider a case where the downward-facing surface SD (measured surface) is measured while biasing the stylus 233U upward with respect to the downward-facing surface SD. In such a case, even when the inclination angle of the downward-facing surface SD is large and tracking is impossible, and the stylus 233U separates from the downward-facing surface SD, there is no collision between the stylus 233U and the downward-facing surface SD. When considered in this way, when configured as in the first embodiment such that the position change detection pulse signal is taken without modification as the feedback signal, and the feedback signal acts in a direction to lift the measuring arm 233, it may be understood that collisions between the stylus 233D and the upward-facing surface SU are prevented. Moreover, when the position change detection pulse signal is used without modification as the feedback signal, there are also the advantages that response is fast and the configuration is also simple.

Other Embodiments

The present invention is not limited to the embodiments described above, and may be modified as needed without departing from the scope of the present invention. When attaching the measurement force applier (voice coil motor) 240 to the measuring arm 233, the magnet 241 may also be fixedly (for example, by a bracket) provided, and the voice coil 242 may also be attached to the measuring arm 233. In addition to a voice coil motor, an actuator using a piezoelectric element or the like can also be configured as the measurement force applier 240.

The decision circuit 460 may perform not only ON-OFF control of the switch mechanism 430, but also ON-OFF control of the frequency-voltage conversion circuit 420. That is, the decision circuit 460 may also set the frequency-voltage conversion circuit 420 to ON (launch) only when the frequency of the position change detection pulse signal exceeds the frequency threshold value, and when the frequency of the position change detection pulse signal is equal to or less than the frequency threshold value, may set the frequency-voltage conversion circuit 420 to OFF (suspended). In cases where the decision circuit 460 performs ON-OFF control of the frequency-voltage conversion circuit 420, the switch mechanism 430 may also be omitted.

In the first embodiment described above, the frequency-voltage conversion circuit 420 is provided to the measurement force controller 400, and the frequency-voltage conversion circuit 420 generates the voltage signal VB that corresponds to the frequency of the position change detection pulse signal as the feedback voltage signal. In such a case, when the frequency of the position change detection pulse signal is high, a voltage signal VB that is that much larger is generated, and therefore there is an advantage in which feedback corresponding to a drop status of the measuring arm 233 is applied. In this example, when only suppressing a sudden drop of the measuring arm 233 is considered, the voltage signal VB need not be a value that corresponds to the frequency of the position change detection pulse signal, and may be a voltage value with a value sufficient to stop the drop of the measuring arm 233 or to be capable of mitigating the drop speed of the measuring arm 233. Accordingly, in such a case, the position change detection pulse signal is not input to the feedback signal generator, but rather the feedback signal generator may be configured to be capable of outputting a voltage value that is set ahead of time.

In each of the embodiments described above, the measurement force controller 400 is configured in an analog circuit way. That is, the measurement force instruction is first initially converted to analog by the digital-analog converter 410, after which a process is performed in which the feedback voltage signal (voltage signal VB) is subtracted from the measurement force instruction voltage (voltage signal VA). In contrast, the subtraction process can, of course, also be performed as a digital calculation. The feedback signal can be generated as a digital signal and the feedback signal can be subtracted from the measurement force instruction by a digital logic operation. In addition, the measurement force controller 400 may also be configured by a CPU and memory, and with software may achieve various functions of a measurement force controller using a predetermined program.

The present invention can be used for a surface property measuring device and a control method for the device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A surface property measuring device comprising:
   a surface property measuring instrument that measures a surface property of a measurable surface of a measurable object by performing tracing scanning of the measurable surface while in contact with the measurable surface, the surface property measuring instrument comprising:
      a measuring arm capable of circular arced movement with a rotary shaft as a pivot point;
      a stylus provided at a distal end of the measuring arm
      a position change detector that detects a change in position due to the circular arced movement of the measuring arm; and
      a measurement force applier that biases the measuring arm in a circular arced movement direction and applies a measurement force to the stylus;
   a relative displacement motor that relatively displaces the surface property measuring instrument and the measurable object in three dimensions such that the surface property measuring instrument performs tracing scanning along the measurable surface; and
   a controller that controls operations of the surface property measuring instrument and the relative displacement motor, the controller comprising:
      a central controller comprising a memory that stores a set of executable instructions, and a processor which when executing the instructions, outputs a measurement force instruction that issues an instruction for an orientation and size of the measurement force; and
      a measurement force control circuit that controls the orientation and size of the measurement force produced by the measurement force applier by applying a control signal to the measurement force applier, wherein the measurement force control circuit:
         sets a predetermined threshold value for a position change speed of the measuring arm in accordance with the measurement speed of the surface property measuring instrument relative to the measurable object,
         monitors a position change detection signal from the position change detector, and when the position change speed of the measuring arm is equal to or less than the predetermined threshold value, applies the control signal to the measurement force applier so as to produce a measurement force with an orientation and size corresponding to the measurement force instruction, and
         applies feedback so as to produce in the measurement force applier a force in a direction that lifts the distal end of the measuring arm upward, when the position change speed of the measuring arm exceeds the predetermined threshold value.

2. The surface property measuring device according to claim 1, wherein the measurement control circuit comprises:
   a measurement force instruction voltage generator that generates a measurement force instruction voltage that is a voltage signal that corresponds to a value of the measurement force instruction;
   a feedback signal generator that generates a feedback signal that is a voltage signal that produces in the measurement force applier a force in a direction that lifts the distal end of the measuring arm upward;
   a subtractor that subtracts the feedback signal from the measurement force instruction voltage; and
   a decision circuit that, based on the position change detection signal from the position change detector, decides whether the position change speed of the measuring arm exceeds the predetermined threshold value, wherein when the decision circuit decides that the position change speed of the measuring arm exceeds the predetermined threshold value, the feedback signal is input to the subtractor.

3. The surface property measuring device according to claim 2, wherein the feedback signal generator comprises a frequency-voltage conversion circuit that generates a voltage signal that corresponds to a frequency value of the position change detection signal from the position change detector.

4. The surface property measuring device according to claim 3, wherein:
   a switch is provided between the feedback signal generator and the subtractor, and the decision circuit:
      sets the switch to ON when the position change speed of the measuring arm exceeds the predetermined threshold value, and
      sets the switch to OFF when the position change speed of the measuring arm is equal to or less than the predetermined threshold value.

5. The surface property measuring device according to claim 4, wherein when the switch is OFF, the surface property measuring instrument measures the surface property of the measurable surface.

6. The surface property measuring device according to claim 5, wherein the measurement control circuit stores a threshold value table showing a correspondence between the measurement speed and the threshold value.

7. The surface property measuring device according to claim 4, wherein the measurement control circuit stores a threshold value table showing a correspondence between the measurement speed and the threshold value.

8. The surface property measuring device according to claim 3, wherein the measurement control circuit stores a threshold value table showing a correspondence between the measurement speed and the threshold value.

9. The surface property measuring device according to claim 2, wherein:
   a switch is provided between the feedback signal generator and the subtractor, and the decision circuit:
      sets the switch to ON when the position change speed of the measuring arm exceeds the predetermined threshold value, and
      sets the switch to OFF when the position change speed of the measuring arm is equal to or less than the predetermined threshold value.

10. The surface property measuring device according to claim 9, wherein when the switch is OFF, the surface property measuring instrument measures the surface property of the measurable surface.

11. The surface property measuring device according to claim 10, wherein the measurement control circuit stores a threshold value table showing a correspondence between the measurement speed and the threshold value.

12. The surface property measuring device according to claim 9, wherein the measurement control circuit stores a threshold value table showing a correspondence between the measurement speed and the threshold value.

13. The surface property measuring device according to claim 2, wherein the measurement control circuit stores a threshold value table showing a correspondence between the measurement speed and the threshold value.

14. The surface property measuring device according to claim 1, wherein the measurement control circuit stores a threshold value table showing a correspondence between the measurement speed and the threshold value.

15. A control method for a surface property measuring device having a surface property measuring instrument having a measuring arm that is supported so as to be capable of circular arced movement with a rotary shaft as a pivot point, a stylus that is provided to a distal end of the measuring arm, a position change detector that detects a change in position due to the circular arced movement of the measuring arm, and a measurement force applier that biases the measuring arm in a circular arced movement direction and applies a measurement force to the stylus, the surface property measuring device further having a relative displacement mechanism that relatively displaces the surface property measuring instrument and a measurable object in three dimensions such that the surface property measuring instrument performs tracing scanning along a measurable surface of the measurable object, the method comprising:

controlling, via a controller, an orientation and size of the measurement force produced by the measurement force applier by applying to the measurement force applier a control signal that is based on a measurement force instruction that issues an instruction for the orientation and size of the measurement force;

setting, via the controller, a predetermined threshold value for a position change speed of the measuring arm in accordance with the measurement speed of the surface property measuring instrument relative to the measurable object;

monitoring, via the controller, a position change detection signal from the position change detector; and applying, via the controller, the control signal to the measurement force applier so as to produce a measurement force with an orientation and size corresponding to the measurement force instruction, when the position change speed of the measuring arm is equal to or less than the predetermined threshold value and applying, via the controller, feedback so as to produce in the measurement force applier a force in a direction that lifts the distal end of the measuring arm upward, when the position change speed of the measuring arm exceeds the predetermined threshold value.

* * * * *